US008019817B2

(12) United States Patent
Yoshida et al.

(10) Patent No.: US 8,019,817 B2
(45) Date of Patent: Sep. 13, 2011

(54) COLLABORATION SUPPORT SYSTEM AND CONTROL METHOD THEREOF

(75) Inventors: Koji Yoshida, Yokohama (JP); Noriaki Sato, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 925 days.

(21) Appl. No.: 11/439,980

(22) Filed: May 25, 2006

(65) Prior Publication Data
US 2006/0282548 A1    Dec. 14, 2006

(30) Foreign Application Priority Data
May 30, 2005    (JP) ................................. 2005-157610

(51) Int. Cl.
*G06F 15/16*    (2006.01)
(52) U.S. Cl. ......... 709/205; 709/232; 715/753; 715/759
(58) Field of Classification Search .................. 709/232, 709/204, 205; 715/753, 759
See application file for complete search history.

(56) References Cited

U.S. PATENT DOCUMENTS

| | | | | |
|---|---|---|---|---|
| 5,176,520 A | * | 1/1993 | Hamilton ...................... | 434/350 |
| 5,583,993 A | * | 12/1996 | Foster et al. .................. | 709/205 |
| 5,872,924 A | * | 2/1999 | Nakayama et al. ........... | 709/205 |
| 5,875,341 A | * | 2/1999 | Blank et al. ................... | 710/260 |
| 5,996,002 A | | 11/1999 | Katsurabayashi et al. .... | 706/204 |
| 6,230,311 B1 | * | 5/2001 | Gerard et al. ................. | 717/108 |
| 6,721,766 B1 | * | 4/2004 | Gill et al. .............................. | 1/1 |
| 7,003,728 B2 | * | 2/2006 | Berque ......................... | 715/753 |
| 7,103,617 B2 | * | 9/2006 | Phatak ......................... | 707/201 |
| 7,283,671 B2 | | 10/2007 | Hiroi et al. ..................... | 382/187 |
| 7,617,418 B2 | * | 11/2009 | Snyder et al. .................... | 714/38 |
| 7,856,473 B2 | * | 12/2010 | Horikiri et al. ............... | 709/205 |
| 2001/0000811 A1 | * | 5/2001 | May et al. ...................... | 709/205 |
| 2002/0049786 A1 | * | 4/2002 | Bibliowicz et al. ........... | 707/511 |
| 2003/0011643 A1 | * | 1/2003 | Nishihata ...................... | 345/810 |
| 2003/0191741 A1 | * | 10/2003 | Kurosawa et al. ................ | 707/1 |
| 2003/0220736 A1 | * | 11/2003 | Kawasaki ...................... | 701/211 |
| 2003/0233361 A1 | * | 12/2003 | Cady .............................. | 707/10 |

(Continued)

FOREIGN PATENT DOCUMENTS
JP    10-040058    2/1998
(Continued)

OTHER PUBLICATIONS http://www.webex.com/services/online-meeting-svc.html, "Meeting Center", WebEx Communications, Inc., May 30, 2005; now archived at http://web.archive.org/web/20050603020551/www.webex.com/services/online-meeting-svc.html, last viewed on Aug. 21, 2007.

(Continued)

*Primary Examiner* — Ian N Moore
*Assistant Examiner* — Dung B Huynh
(74) *Attorney, Agent, or Firm* — Fitzpatrick, Cella, Harper & Scinto

(57) ABSTRACT

In a system having plural terminals including terminals A, B, when the terminal A is editing a data object and editing information is shared among the plural terminals, if the terminal B performs a changeover operation of displayed page, the editing operation in the terminal A is cancelled, and the editing information is deleted in the other terminals. In the terminal A, the editing information by that time is held, and when the data object is restored, the held editing information is transmitted to the other terminals. Then the initial display status is restored in the other terminals.

6 Claims, 10 Drawing Sheets

U.S. PATENT DOCUMENTS

| | | | |
|---|---|---|---|
| 2004/0002327 A1* | 1/2004 | Tanaka | 455/418 |
| 2004/0010661 A1* | 1/2004 | Katsuragi et al. | 711/114 |
| 2006/0150108 A1 | 7/2006 | Adachi et al. | 715/750 |
| 2006/0212757 A1* | 9/2006 | Ross et al. | 714/34 |
| 2006/0265665 A1 | 11/2006 | Yoshida | 715/781 |

FOREIGN PATENT DOCUMENTS

| | | |
|---|---|---|
| JP | 2004-348189 | 12/2004 |
| WO | WO 2006/025549 | 3/2006 |

OTHER PUBLICATIONS http://www.centra.com/products/index.asp, "Centra 7", Centra Software, Inc., May 28, 2005, now archived at http://web.archive.org/web/20050527084805/www.centra.com/products/index.asp, last viewed on Aug. 21, 2007.

Office Action from Japanese Patent Appln. 2005-157610, Nov. 15, 2010, 4 pgs. No English translation.

* cited by examiner

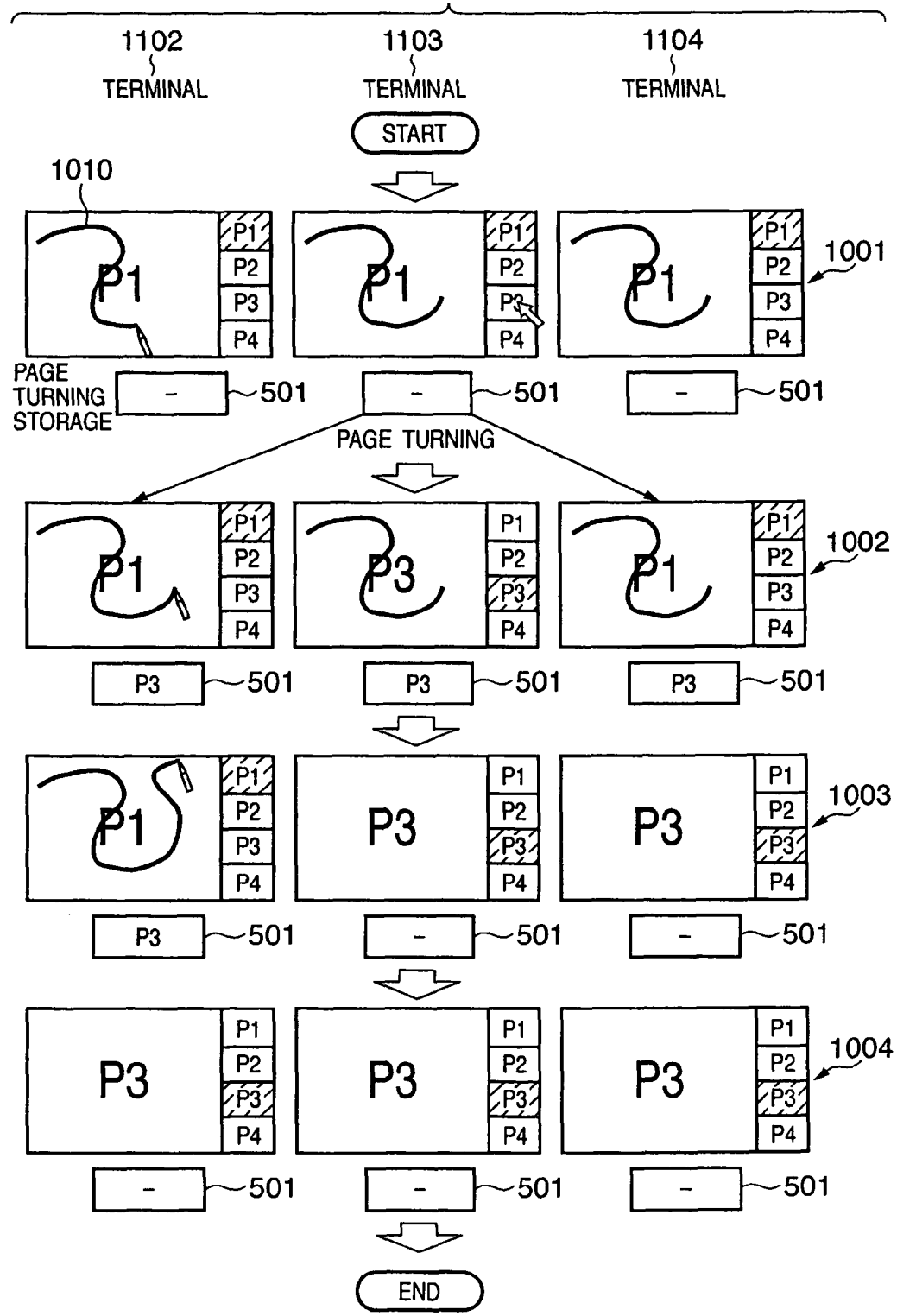

COLLABORATION SUPPORT SYSTEM AND CONTROL METHOD THEREOF

FIELD OF THE INVENTION

The present invention relates to a collaboration support system and a control method thereof for connecting plural terminals via a network and enabling users of the terminals to perform cooperation work on the network.

BACKGROUND OF THE INVENTION

In recent years, a collaboration support system to enable plural users to perform cooperation work on a network is widely used in companies, government offices, municipalities and the like. The following factors of the popularization of the support system can be given.
(1) In recent years, by virtue of improvement in network environment and computer processing performance, a large amount of information can be transmitted and processed in a real time manner. Accordingly, communications such as large-amount data communication and no-delay data communication that are important in the collaboration support system, can be performed.
(2) In companies, government offices and municipalities, globalization has been advanced, and situations called distributed working, in which workers related to a job are located in various places in a country or in the world, are increased. In such situations, it takes much time and labor for these workers to get together to perform a meeting. However, by introduction of the collaboration support system, the cost and time for the meeting can be avoided, and in the distributed working environment, mutual communication among the workers can be quickly realized at any time without awareness of distance in the real world.

In the collaboration support system, the users perform cooperation working via the network. The system has a "remote whiteboard" function for the users to handle a whiteboard function, a "remote presentation" function for presentation among the users in remote places, and the like.

As this collaboration support system is a network application, it is impossible to completely synchronize data among terminals in remote places due to network communication delay or the like. Further, as a conflict may occur between operations by the users in remote places, it is difficult to perform smooth cooperation working. Accordingly, to realize smooth cooperation working, some arrangement is required. Similarly, some arrangement is required upon page turning operation in the remote whiteboard function. In the page turning operation, it is necessary to satisfy the following conditions.
(A) Images on screens of all the terminals are synchronized.
(B) The timing of page turning operation is not limited (the page turning operation can be performed at any time).
(C) Page turning operation is immediately reflected in other terminals.

Arrangements to satisfy these conditions are introduced in the conventional collaboration support system. For example, a Web meeting system "Meeting Center" by WebEx Communications, Inc. (see homepage of WebEx Communications, Inc., http://www.webex.com/), a Web meeting system "Centra 7" by Centra Software, Inc. (see homepage of Centra Software, Inc., http://www.centra.com/) and the like are known. In these systems, upon page turning operation in the remote whiteboard function, a page turning operation has priority over a drawing operation, thereby the page turning operation is synchronized in all the terminals. According to the techniques described in these documents, upon page turning operation, when a drawing operation is being performed in one terminal or another terminal, the drawing operation is cancelled. By this arrangement, the page turning operation is smoothly performed in all the terminals, and the above conditions are satisfied.

However, in the above-described support systems for cooperation, the following problems occur upon page turning operation.
(1) The drawing operation in the respective terminals is forcibly cancelled.
(2) The record of the cancelled drawing operation does not remain.

As a drawing operation by a terminal is forcibly cancelled by a page turning operation of other terminal, the users of the respective terminals feel stressed since they cannot smoothly perform the drawing operation.

SUMMARY OF THE INVENTION

The present invention has been made to solve the drawbacks of the above-described conventional techniques.

Further, one of the characteristic features of the present invention is to provide a collaboration support system and a control method thereof to reduce as much as possible the influence of a changeover operation of displayed image in one of plural terminals to a display of a common image on the other terminals, then easily resume an operation on a data object in the terminal which has been cancelled by the changeover operation of displayed image.

Further, another characteristic features of the present invention is to provide a collaboration support system and a control method thereof to perform processing in a terminal in which an object is being operated, different from processing in the other terminals, with respect to a changeover operation of displayed image in one of plural terminals displaying a common image, thereby the stress upon a user of the terminal in which the object is being operated can be suppressed.

According to the present invention, there is provided with a collaboration support system in which terminals are interconnected via a network, and a data object can be shared among plural terminals, comprising:
a display interrupt unit configured to, in a case that a common image related to a data object based on an operation in a first terminal among the plural terminals is displayed in display units of the plural terminals, if a changeover operation of displayed image is performed in any of the plural terminals, interrupt the display of the common image in the plural terminals;
a storage unit configured to store the data object upon a display interrupt by the display interrupt unit in the first terminal; and
a display resume unit configured to, in a case that it is instructed to resume processing of the data object, change the common image to an image prior to the changeover operation of displayed image, based on the data object stored in the storage unit.

According to the present invention, there is provided with a collaboration support system in which terminals are interconnected via a network, and a data object can be shared among plural terminals, comprising:
a transmission unit configured to, in a case where a changeover operation of displayed image is performed in a first terminal among the plural terminals, transmit changeover information to terminals of the plural terminals other than the first terminal;

a storage unit configured to store the changeover information transmitted from the transmission unit in the respective terminals;

a judgment unit configured to judge whether or not a second terminal which has received the changeover information transmitted from the transmission unit is operating a data object by an operation in the second terminal; and a prohibition unit configured to, in a case where it is judged by the judgment unit that the second terminal is operating the data object, prohibit the changeover of displayed image in the second terminal.

Further, according to the present invention, there is provided with a control method for a collaboration support system in which terminals are interconnected via a network, and a data object can be shared among plural terminals, comprising:

a display interrupt step of, in a case where a common image related to a data object based on an operation in a first terminal among the plural terminals is displayed in display units of the plural terminals, if a changeover operation of displayed image is performed in any of the plural terminals, interrupting the display of the common image in the plural terminals;

a storage step of storing the data object upon display interrupt in the display interrupt step in the first terminal; and a display resume step of, in a case where it is instructed to resume processing of the data object, changing the common image to an image prior to the changeover operation of displayed image, based on the data object stored in the storage step.

Furthermore, according to the present invention, there is provided with a control method for a collaboration support system in which terminals are interconnected via a network, and a data object can be shared among plural terminals, comprising:

a transmission step of, in a case where a changeover operation of displayed image is performed in a first terminal among the plural terminals, transmitting changeover information to terminals other of the plural terminals than the first terminal;

a storage step of storing the changeover information transmitted in the transmission step into the respective terminals;

a judgment step of judging whether or not a second terminal which has received the changeover information transmitted in the transmission step is operating a data object by an operation in the second terminal; and a prohibition step of, in a case where it is judged in the judgment step that the second terminal is operating the data object, prohibiting the changeover of displayed image in the second terminal.

Note that the summary of the invention does not cover all the features of the present invention, but other claims and combinations of the features thereof can be included in the present invention.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 10 is a transition diagram of screen displays in the respective terminals in a page turning sharing operation according to the second embodiment.

DETAILED DESCRIPTION OF THE PREFERRED EMBODIMENTS

A preferred embodiment of the present invention will now be described in detail with reference to the accompanying drawings. It should be noted that the embodiment below does not limit the present invention set forth in the claims and that not all of the combinations of features described in the embodiment are necessarily essential as means for the solution by the invention.

First Embodiment

Figure 1:
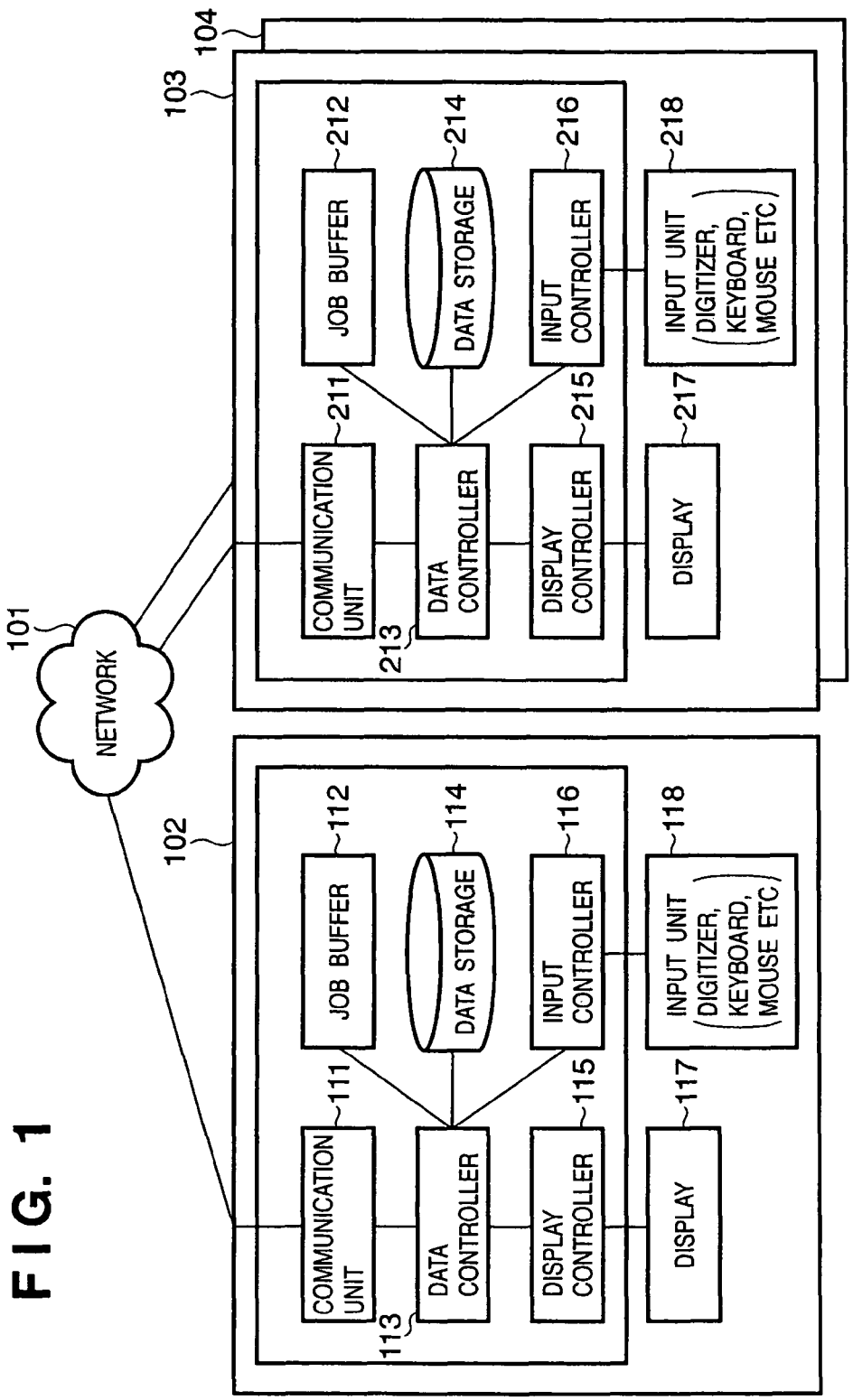
FIG. 1 is a block diagram showing the configuration of a collaboration support system according to a first embodiment of the present invention.

FIG. 1 is a block diagram showing the configuration of a collaboration support system according to a first embodiment of the present invention.

In FIG. 1, numerals 102 to 104 denote terminals which respectively have a communication function and which are connected to a network 101. Note that the terminals 102 to 104 respectively have a terminal computer, program data for cooperation support system terminal, a display, and an input device (including a digitizer, a keyboard and a mouse) and the like. In the first embodiment, as the respective terminals have basically the same construction, the construction of the terminal 102 will be described below.

The terminal 102 has a communication unit 111, a job buffer 112, a data controller 113, a data storage 114, a display controller 115, an input controller 116, a display 117 and an input unit 118. The communication unit 111 performs communication control processing for information transmission/reception between another terminal via the network 101. The job buffer 112 is a buffer for storing processing content inputted from the communication unit 111 or the input controller 116. As the buffer has a queue structure, a job which has been inputted first is processed first. The data controller 113 controls processing of data used in cooperation working such as cooperation starting and ending processings and remote whiteboard processing. The data storage 114 holds setting information of the terminal 102, information on a connection destination terminal, information transmitted/received upon use of the collaboration support system, and the like. The display controller 115 performs processing for outputting information to the display 117 to display an image or message and the like. The input controller 116 receives information inputted by a user's operation using the input unit 118 (digitizer, keyboard, mouse or the like), and transmits the information to the data controller 113. The display (display unit) 117, having a CRT, a liquid crystal display or the like, presents various information to the user. The input unit 118, having a digitizer, a keyboard, a mouse and the like, generates various data and instruction signals based on the user's operation and supplies the data and signals to the input controller 116.

Further, the terminal 103 has a communication unit 211, a job buffer 212, a data controller 213, a data storage 214, a display controller 215, an input controller 216, a display 217 and an input unit 218. As the constructions, the operations and the processings of these elements are basically the same as those of the terminal 102 described above, the explanations thereof will be omitted.

Next, the flow of a data object sharing operation in the collaboration support system according to the first embodiment will be described in detail with reference to FIGS. 2 and 3. In this example, the new data object sharing operation in the terminals 102 and 103 will be described. Note that in this example, the operation is performed in the two terminals 102 and 103, however, the operation is similarly performed in other terminals connected to the network 101, and further, similarly performed among three or more terminals.

Figure 2:
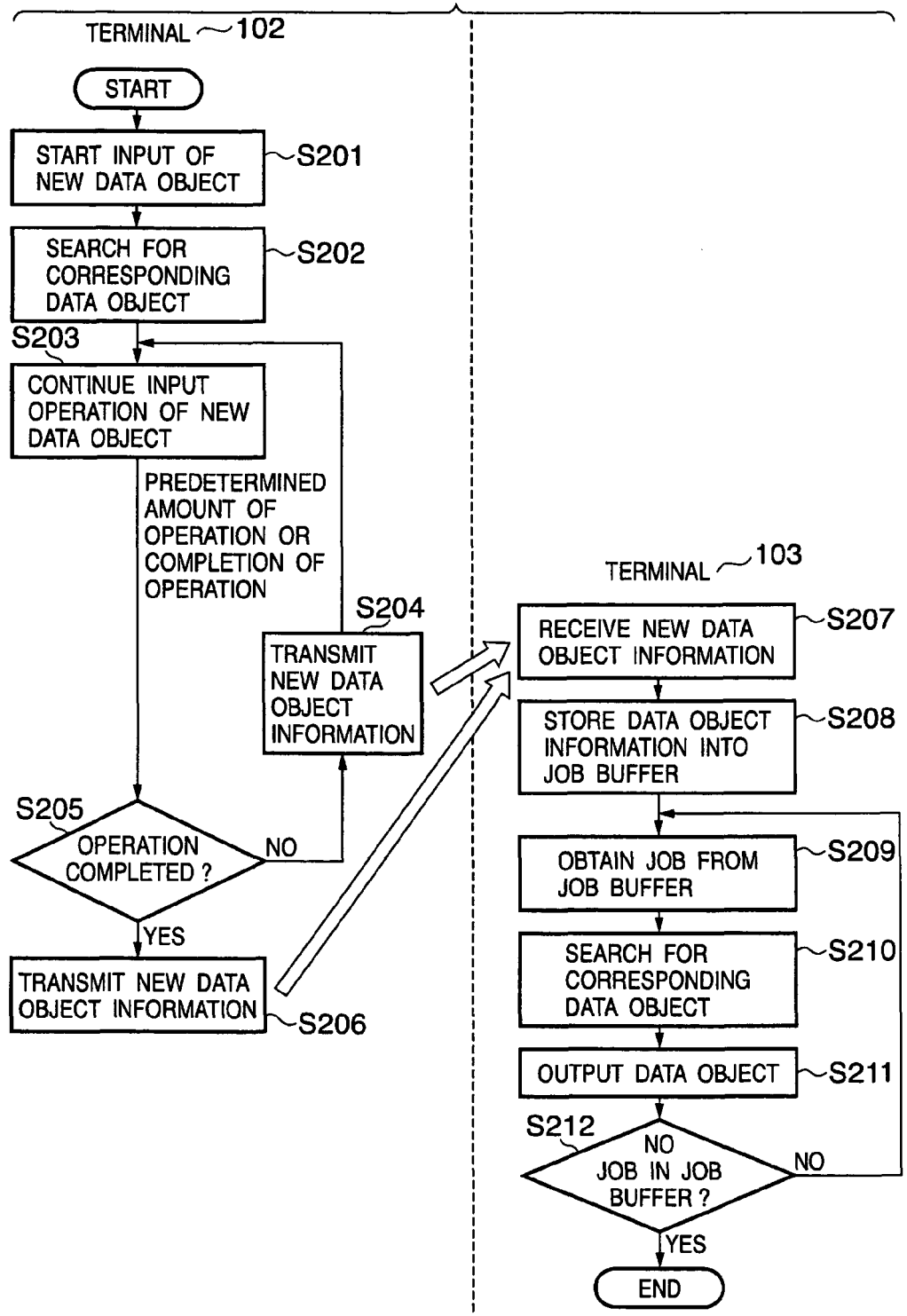
FIG. 2 is a flowchart showing processing in a terminal which newly generates a data object and another terminal which receives the newly generated data object as a common object according to the first embodiment.
Figure 3:
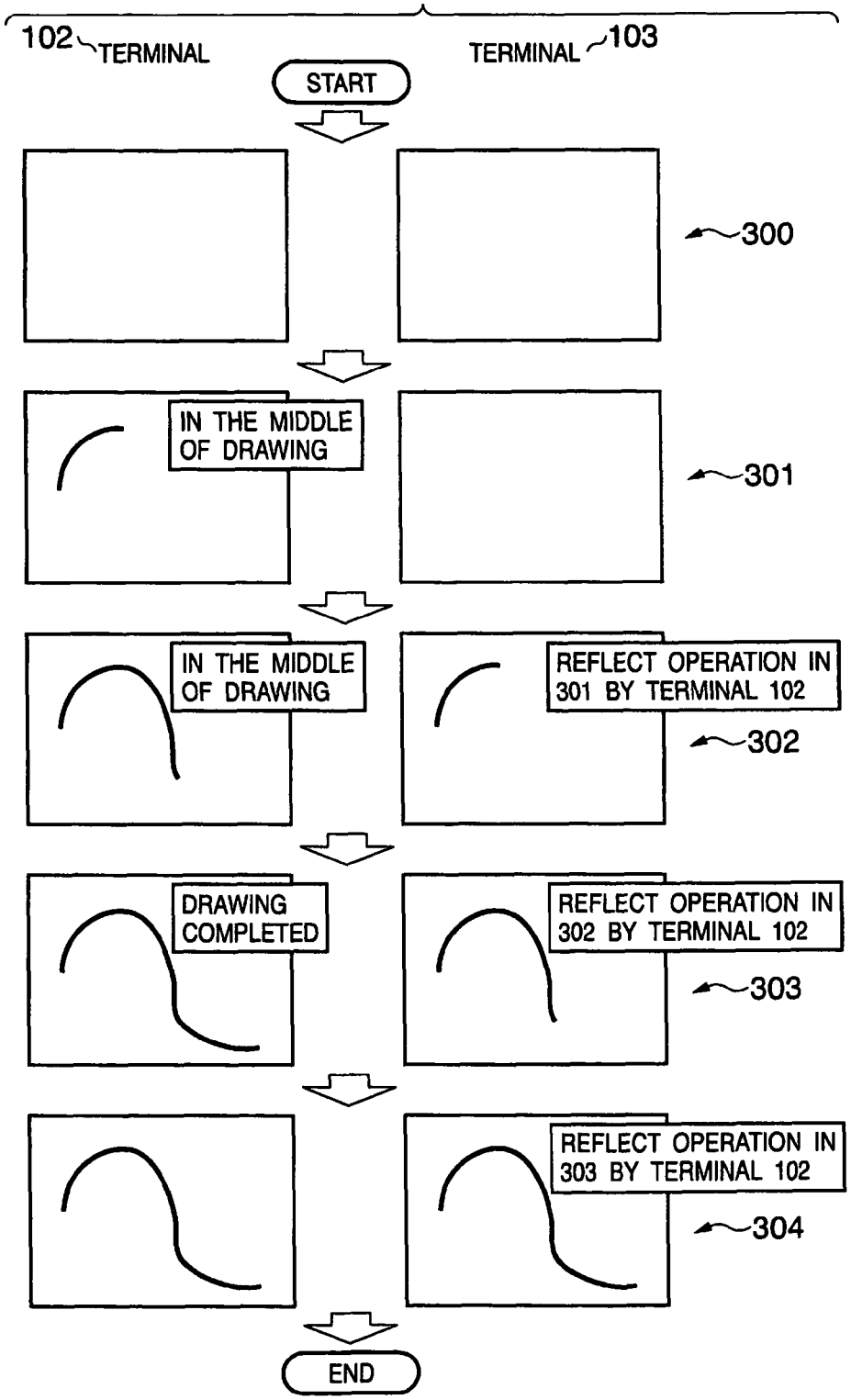
FIG. 3 is a transition diagram of a display content displayed on displays of two terminals according to the first embodiment.

FIG. 2 is a flowchart showing an example where a data object is newly generated by the terminal 102, the data object is received by the terminal 103, and the data object is shared between the terminals 103 and 102, according to the first embodiment. Further, FIG. 3 is a transition diagram of a display content displayed on displays 117 and 217 of the two terminals 102 and 103. Note that for the sake of simplification of explanation, interconnection has been previously established among the terminals 102 to 104 via the network 101 using the respective communication units, and the start processing (system entry processing, remote whiteboard function start processing and the like) of the collaboration support system has been already implemented.

At the starting of the processing shown in the flowchart of FIG. 2, the terminals 102 and 103 have started the remote whiteboard function, and the whiteboard displayed on the displays 117 and 217 of the terminals is shared. However, nothing has been drawn (displayed) on the whiteboard (a display example 300 in FIG. 3).

At step S201 in FIG. 2, the terminal 102 starts reception of the user's operation to newly generate a data object via the input controller 116 from the input unit 118. Next, at step S202, the data controller 113 searches the data storage 114 so as to determine whether or not a data object related to the information inputted at step S201 has previously existed. Then, the data controller 113 determines to be sure that no data object related to the input operation has previously existed, i.e., the data object is a new data object. Next, at step S203, the data controller 113 performs processing related to the new data object in a real time manner, by the completion of the user's input operation using the input unit 118. Then the data controller 113 sequentially stores the data object information in the middle of input into the data storage 114, and in parallel to this operation, displays the information on the display 117 using the display controller 115 so as to inform the user of the result of the operation (corresponding to display examples 301 to 304 on the terminal 102 in FIG. 3). Each time a predetermined amount of operation has been performed for the data object, step S204 is performed. At step S204, the data controller 113 transmits the data object information to the terminal 103 having the shared whiteboard via the communication unit 111 and the network 101, then the process returns to step S203. Further, when the user's operation with respect to the data object has been completed, the process proceeds from step S205 to step S206. Then the data controller 113 transmits the data object information to the terminal 103 having the shared whiteboard via the communication unit 111 and the network 101, and the processing in the terminal 102 ends (a display example 304 in FIG. 3).

Note that in this example, a new data object is generated, however, the present invention is not limited to the new data object. For example, in a case that the data object exists in the data storage 114, the data object is read from the data storage 114. Then the invention can be similarly adopted to a case in where the read data object is displayed on the display 117, and in accordance with the user's operation, the existing data object is edited. The case can be similarly applied to the following embodiments.

Next, the processing in the terminal 103 will be described. In step S207, the terminal 103 receives the data object, newly generated by the terminal 102 and transmitted at steps S204 and S206, via the network 101 and the communication unit 211. Next, at step S208, the received data object is supplied to the data controller 213, then processed by the controller 213, and temporarily stored in the job buffer 212. Next, at step S209, the data object stored in the job buffer 212 is processed by the data controller 213 sequentially from the first-stored data. Next, at step S210, the data controller 213 searches the data storage 214 so as to determine whether or not information related to the data object received in step S207 has already existed in the terminal 103, and recognizes that no information related to the data object related to the received data object exists (i.e., this is a new object). Next, at step S211, the data controller 213 stores the received data object information into the data storage 214 so as to process the input information (a command to newly generate a data object). Further, the data controller 213 displays the information on the display 217 via the display controller 215 so as to inform the user of the operation. In FIG. 3, numerals 301 to 304 show examples of display on the display unit 217 of the terminal 103 in this case. In this manner, in the terminal 103, an image reflecting the drawing operation in the terminal 102 is displayed on the display 217.

Next, at step S212, the data controller 213 examines the queue of the job buffer 212 to determine whether or not an unprocessed job exists. Then, if an unprocessed job exists in the job buffer 212, the process returns to step S209 to perform the above-described processing. In a case that no unprocessed job exists, the process ends.

Next, a page turning operation in the collaboration support system according to the first embodiment will be described in detail. The explanation of this operation will be performed from two viewpoints. As the first explanation, the operations in the terminals 102 and 103 will be described in detail with reference to the flowcharts of FIGS. 4 and 5. On the other hand, as the second explanation, screen transition will be described in detail with reference to transition diagram of the display screens in the terminals 102 to 104 in FIG. 6.

First, the flow of the page turning operation in the collaboration support system according to the first embodiment will be described in the page turning operation in the two terminals 102 and 103 with reference to the flowcharts of FIGS. 4 and 5.

Figure 4:
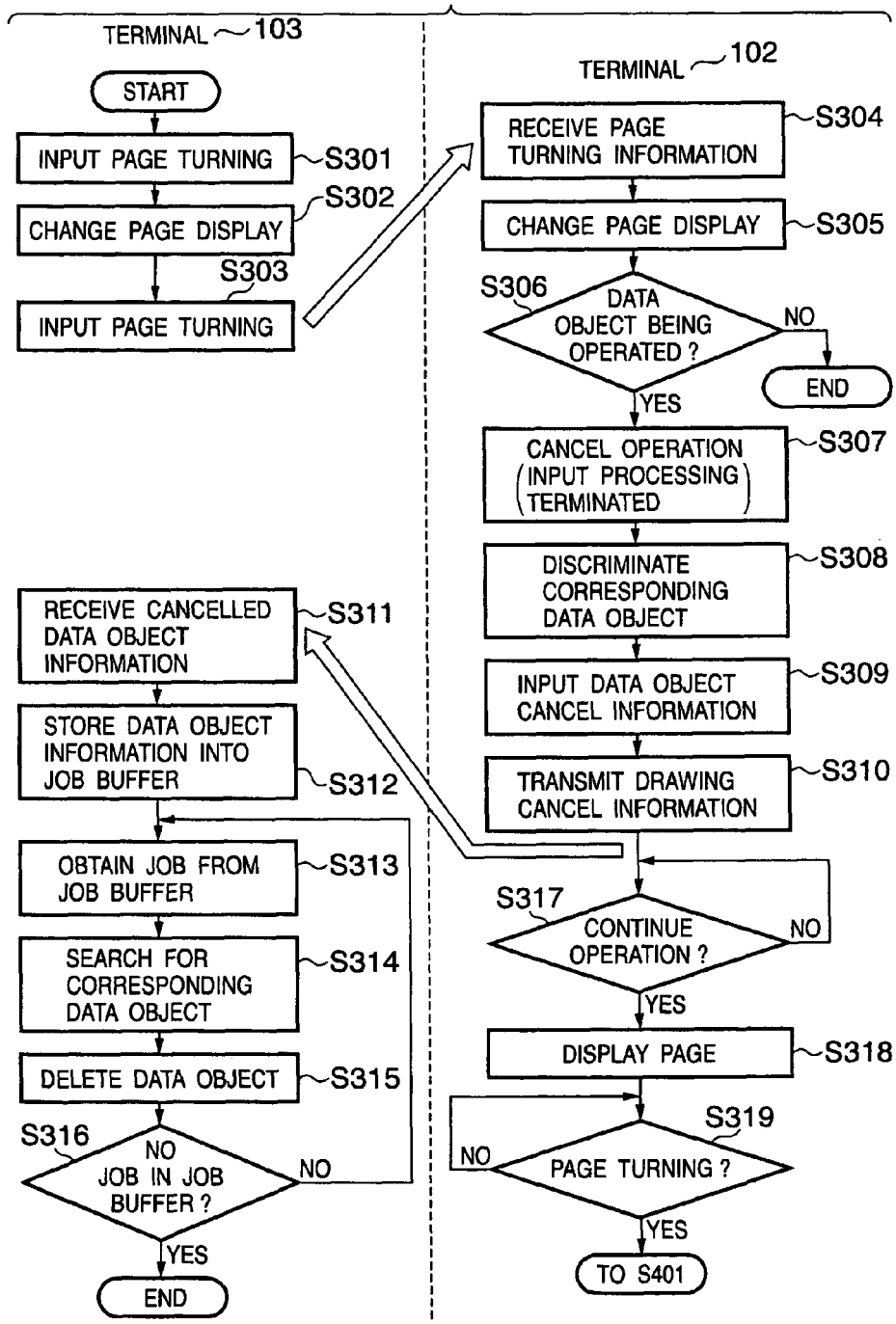
FIG. 4 is a flowchart showing processing in terminals 102 and 103 when a page turning operation is performed in the terminal 103, according to the first embodiment.

FIG. 4 is a flowchart showing processing in the terminals 102 and 103 when a page turning operation is performed in the terminal 103, according to the first embodiment.

Figure 5:
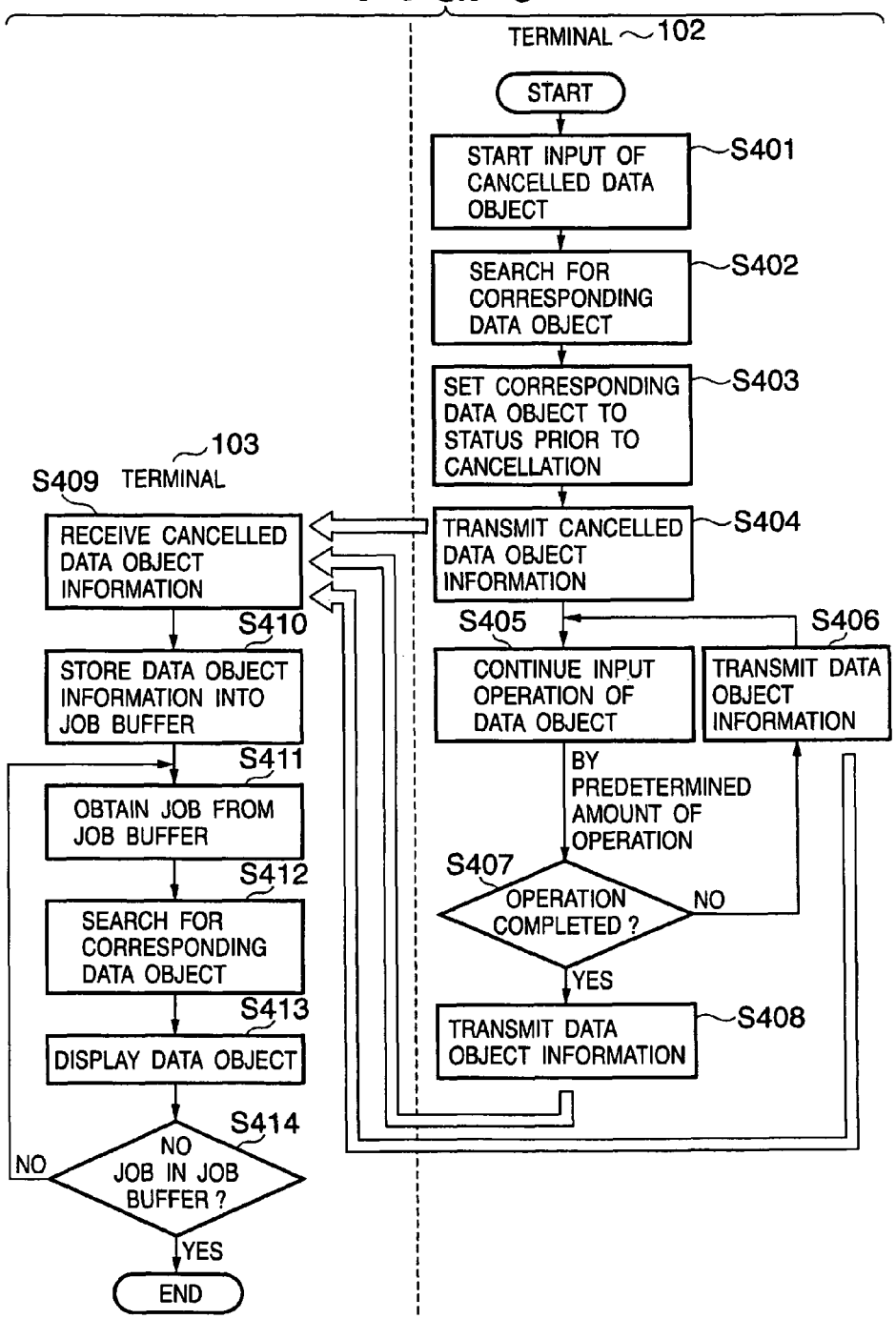
FIG. 5 is a flowchart showing processing in the terminals 102 and 103 when a drawing operation of a data object, cancelled by the page turning operation in the terminal 103, is resumed in the terminal 102, according to the first embodiment.

FIG. 5 is a flowchart showing processing in the terminals 102 and 103 when a drawing operation of data object, cancelled by the page turning operation in the terminal 103, is resumed in the terminal 102, according to the first embodiment. Note that for the sake of simplification of explanation as in the case of the flowchart of FIG. 2, upon start of these processings, interconnection has been previously established among the terminals 102 to 104 via the network 101 using the respective communication units, and the start processing (system entry processing, remote whiteboard function start processing and the like) of the collaboration support system has been already performed.

First, the page turning operation in the terminals 102 and 103 will be described in detail with reference to the flowchart of FIG. 4. Note that before the start of this processing, the terminals 102 and 103 have started the remote whiteboard function, and the whiteboard shared by the remote whiteboard function has plural pages. Further, the first page (P1) of the whiteboard is displayed on the displays 117 and 217 of the terminals 102 and 103, and one data object (a free curve 610 in FIG. 6) is drawn in the first page. The transition of this page and the data object are shared between these terminals 102 and 103. Note that in FIG. 4, processing at steps S301 to S303 and processing at steps S311 to S316 is implemented in the terminal 103, and processing at steps S304 to S310 and processing at steps S317 to S319 is implemented in the terminal 102.

First, at step S301, the terminal 103 receives the user's input operation instructing page turning via the input controller 216 from the input unit 218. Next, at step S302, the data controller 213 of the terminal 103 obtains turning destination page information from the data storage 214 in accordance with the page turning instruction, and displays the information on the display 217 via the display controller 215 (a display example 602 in FIG. 6). Next, at step S303, the data controller 213 transmits the page turning information to the other terminal having the shared whiteboard (the terminal 102 here) via the communication unit 211 and the network 101.

At step S304, the terminal 102 receives the page turning information transmitted from the terminal 103 by the communication unit 111 via the network 101. Next, at step S305, the data controller 113 of the terminal 102 obtains the turning destination page information (third page information in FIG. 6) from the data storage 114 so as to process the received page turning information, then displays the information on the display 117 via the display controller 115 (a display example 603 in FIG. 6). Next, at step S306, upon page turning at step S305, it is determined whether or not the user of the terminal 102 is operating a data object (the free curve in FIG. 6) and information for the operation is inputted from the input unit 118. When the information for operation of the data object is inputted, the process proceeds to step S307, while when the user is not operating an object, the processing in the terminal 102 is terminated. That is, the displayed page is changed and the process ends.

In the first embodiment, the user is operating a data object in the terminal 102 and the information of the operation of the data object is inputted from the input unit 118. Accordingly, the process proceeds to step S307, at which the data controller 113 of the terminal 102 ignores the user's input information related to the operation of the data object at this time so as to stop inputting the information related to the user's operation of the object. Next, at step S308, the data controller 113 of the terminal 102 searches the data storage 114 so as to discriminate the data object related to the operation of which has been cancelled. Next, at step S309, the data controller 113 adds cancel information to the data object found by the data search at step S308 and re-stores the data object. The cancel information indicates that the operation related to the data object has been terminated in the middle. Accordingly, the data object to which the cancel information is added is displayed in a display form different from a normal display form (in FIG. 6, gray display as display examples 604 and 605 in the terminal 102) such that the interruption of the operation related to the data object can be recognized. Next, at step S310, the data controller 113 of the terminal 102 transmits the cancel information of the data object to the other terminal having the shared whiteboard (the terminals 103 and 104 here) via the communication unit 111 and the network 101.

At step S311, the terminal 103 receives the cancel information of the data object transmitted from the terminal 102 via the network 101. Next, at step S312, the data controller 213 of the terminal 103 temporarily stores the received information into the job buffer 102. Next, at step S313, the data controller 213 obtains first-stored data in the job buffer 212. Next, at step S314, the data controller 213 searches the data storage 214 so as to discriminate a data object related to the stored data. At step S315, the data controller 213 deletes the data object information found by the data search at step S314. Then, at step S316, the data controller 213 examines the queue of the job buffer 212 to determine whether or not an unprocessed job exists. If no unprocessed job exists, as it can be considered that the operation in the terminal 103 accompanying the page turning has been completed, processing at step S401 in FIG. 5 is started in the terminal 102. On the other hand, at step S316, if it is determined that an unprocessed job exists, the process proceeds to step S313 to repeat the above processing.

Further, at step S317 after the above-described step S310, the terminal 102 determines whether or not it is instructed to continue the drawing process performed by that time. In a case that the user of the terminal 102 instructs to continue the operation via the input unit 118, the process proceeds to step S318, at which the page where the drawing has been initially performed (e.g., the first page) is displayed. At this time, the display of this page is changed from the normal display form (the display example 604 in the terminal 102 in FIG. 6) based on the cancel information stored at step S309. Then at step S319, if it is instructed via the input unit 118 to change the page display to the first page (P1), the process proceeds to step S401 (FIG. 5). Then, processing to change the display to the first page prior to the input of the page turning instruction (S301) in the terminal 103 is started.

Next, the flowchart of FIG. 5 will be described. Note that in FIG. 5, processing at steps S401 to S408 is implemented in the terminal 102, and processing at steps S409 to S414 is implemented in the terminal 103.

At step S401, the terminal 102 starts reception of information by the user's input operation for editing the data object, cancelled at step S309 in FIG. 4, via the input controller 116 from the input unit 118. At step S402, the data controller 113 of the terminal 102 searches the data storage 114 to discriminate a data object related to the information related to the input operation. Next, at step S403, the data controller 113 deletes the cancel information from the data object found by the data search at step S403. Then, the data controller 113 changes the display of the data object on the display 117 to the status (the display example 602 in FIG. 6) prior to the page turning (i.e., cancellation), via the display controller 115. Next, at step S404, the data controller 113 transmits the data object information to the other terminals having the shared whiteboard (the terminals 103 and 104 here) via the communication unit 111 and the network 101. Then the displays in the respective terminals (the terminals 103 and 104 here) are changed as shown in the example 606 in FIG. 6.

Next, at step S405, the data controller 113 performs processing related to the data object, in a real time manner, by the completion of the data input. The data controller 113 sequentially stores items of the information of the data object in the middle of input operation into the data storage 114, and displays the data on the display 117 using the display controller 115 so as to cause the user to confirm the result of the operation. Then, each time a predetermined amount of the input operation on the data object has been performed, step S406 is performed, and the data controller 113 transmits the information of the data object to the other terminals having the shared whiteboard (the terminals 103 and 104 here) via the communication unit 111 and the network 101. Then the process proceeds to step S405.

Further, at step S407, it is determined that the input operation on the data object has been completed, the process proceeds to step S408. The data controller 113 transmits the information of the data object to the other terminals having the shared whiteboard (the terminals 103 and 104 here) via the communication unit 111 and the network 101. Then the process in the terminal 102 ends.

Then, at step S409, the terminal 103 receives the information of the data object transmitted from the terminal 102 by the communication unit 211 via the network 101. Next, at step S410, the data controller 213 of the terminal 103 temporarily stores the received information into the job buffer 212. Next, at step S411, the data controller 213 obtains the first-stored item of the information from the job buffer 212. Next, at step S412, the data controller 213 searches the data storage 214 to discriminate a data object related to this input operation. Next, at step S413, the data controller 213 displays the information of the data object found by the data search at step S412 on the display 217 using the display controller 215. Next, at step S414, the data controller 213 examines the queue of the job buffer 212 to determine whether or not an unprocessed job exists. In a case that no unprocessed job exists, the process ends, while in a case that an unprocessed job exists, the process proceeds to step S411, to repeat the above-described processing. Note that the processing at these steps S409 to S414 is similarly performed in the other terminal 104.

Next, the flow of the page turning sharing operation described in the flowcharts of FIGS. 4 and 5 will be described in detail with reference to the screen transition diagram of FIG. 6. As described above, FIG. 6 depicts a transition diagram of the displays of the terminals 102 to 104 upon page turning sharing operation. In this example, the terminals 102 to 104 have previously started the remote whiteboard function, and the whiteboard shared among the terminals has four pages.

Figure 6:
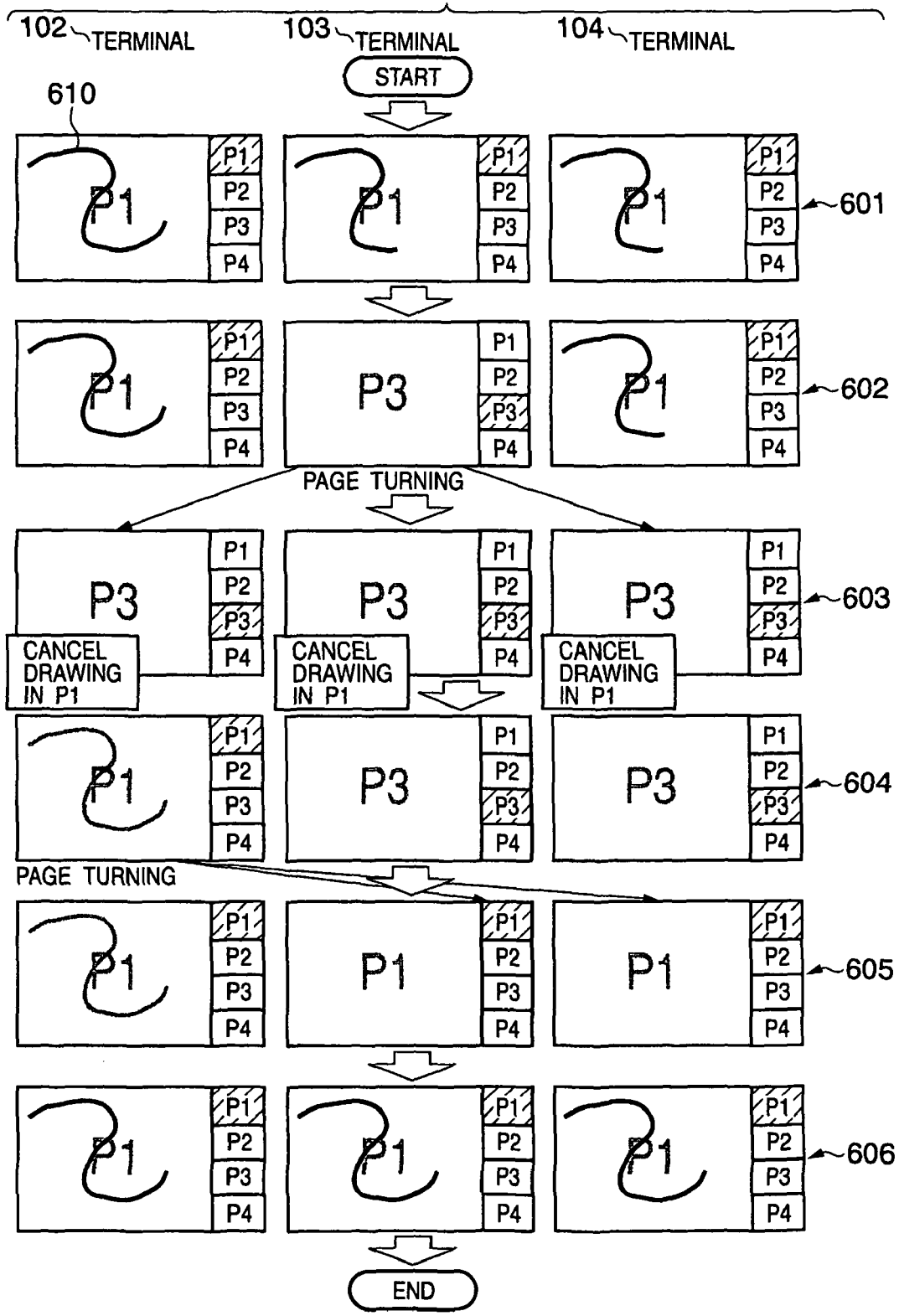
FIG. 6 is a transition diagram of screen displays in three terminals sharing the page turning operation according to the first embodiment.

At first, as shown in the display example 601 in FIG. 6, the first page (P1) of the whiteboard is displayed on the displays of the respective terminals 102 to 104. In the terminal 102, the free curve 610 is drawn in the first page, and as the information of the drawing is shared by the terminals 103 and 104, the same image is displayed on the displays of the respective terminals. Note that there is some time lag between the display of the data object in the terminal 102 and that in the terminals 103 and 104 due to delay on the network 101, timings of sharing of the data object and the like.

In this status, the user of the terminal 103 performs an operation to change the display to the third page (P3) (the display example 602 in FIG. 6). At this time, the terminal 103 deletes the drawing data of the free curve 610 received from the terminal 102.

The information of the page turning operation in the terminal 103 is transmitted from the terminal 103 to the terminals 102 and 104. Then the display of the first page (P1) is interrupted and changed to the third page (P3) in the terminals 102 and 104 (the display example 603 in FIG. 6). At this time, the drawing of the free curve 610 in the first page is cancelled in the terminal 102. On the other hand, the information of the data object in the first page is deleted in the terminal 104. Next, the user of the terminal 102 performs the above-described operation to restore the display of the first page (P1). Then in the terminal 102, the data object drawn in the first page is displayed (the display example 604 in FIG. 6). At this time, in the terminal 102, the data object in the first page, the operation of which has been cancelled upon the page turning to the display example 603, is displayed in a display form (the gray display in the display example 604) different from that prior to the cancellation (the display example 602) such that the cancellation can be recognized.

Thus, as the page turning has been instructed in the terminal 102, the information of the page turning is transmitted from the terminal 102 to the terminals 103 and 104. Then the displays of the terminals 103 and 104 are changed to the first page (the display example 605 in FIG. 6). Note that at this time, in the terminals 103 and 104, as the cancelled data object information (the free curve 610) in the first page has been deleted, the data object in the first page is not displayed.

Next, in the status of the display example 605, when the user of the terminal 102 selects the data object in the first page, the display of the data object in the first page is changed to the status prior to the cancellation (the display example 602). Then, in the terminal 102, the operation on the cancelled data object can be resumed. Further, the information of the data object in the first page (the free curve 610) is transmitted to the terminals 103 and 104, and the same image is displayed in the respective terminals (the display example 606 in FIG. 6).

According to the first embodiment, in a collaboration support system where plural terminals, each having at least a display unit and an input unit, are interconnected via a network and the terminals share a data object. In the system, while operating on a page by a first terminal, if an operation of page turning or the like is performed in a second terminal, generating or editing operation on the data object in the page by the first terminal is cancelled in the middle of the operation. At this time, in the first terminal where the operation has been cancelled in the middle, the information related to the operation on the data object by that time is not deleted but stored in the first terminal. Then, after a completion of the page turning operation, the operation on the data object can be resumed again by the first terminal. Thus, even when processing in the first terminal is cancelled in the middle by the page turning operation in the second terminal, the processing can be easily resumed by the first terminal.

Further, in a case where the information of the data object of which processing has been cancelled is stored and then displayed again, the data object is displayed in a form to inform the user that the data object is in the middle of operation. Accordingly, the users of the respective terminals can recognize the status of the data object as to whether or not the operation of the data object has been interrupted in the middle, whether or not the users' intentions by that time are reflected, or whether or not it is necessary to resume processing to further operate the data object.

Second Embodiment

Figure 7:
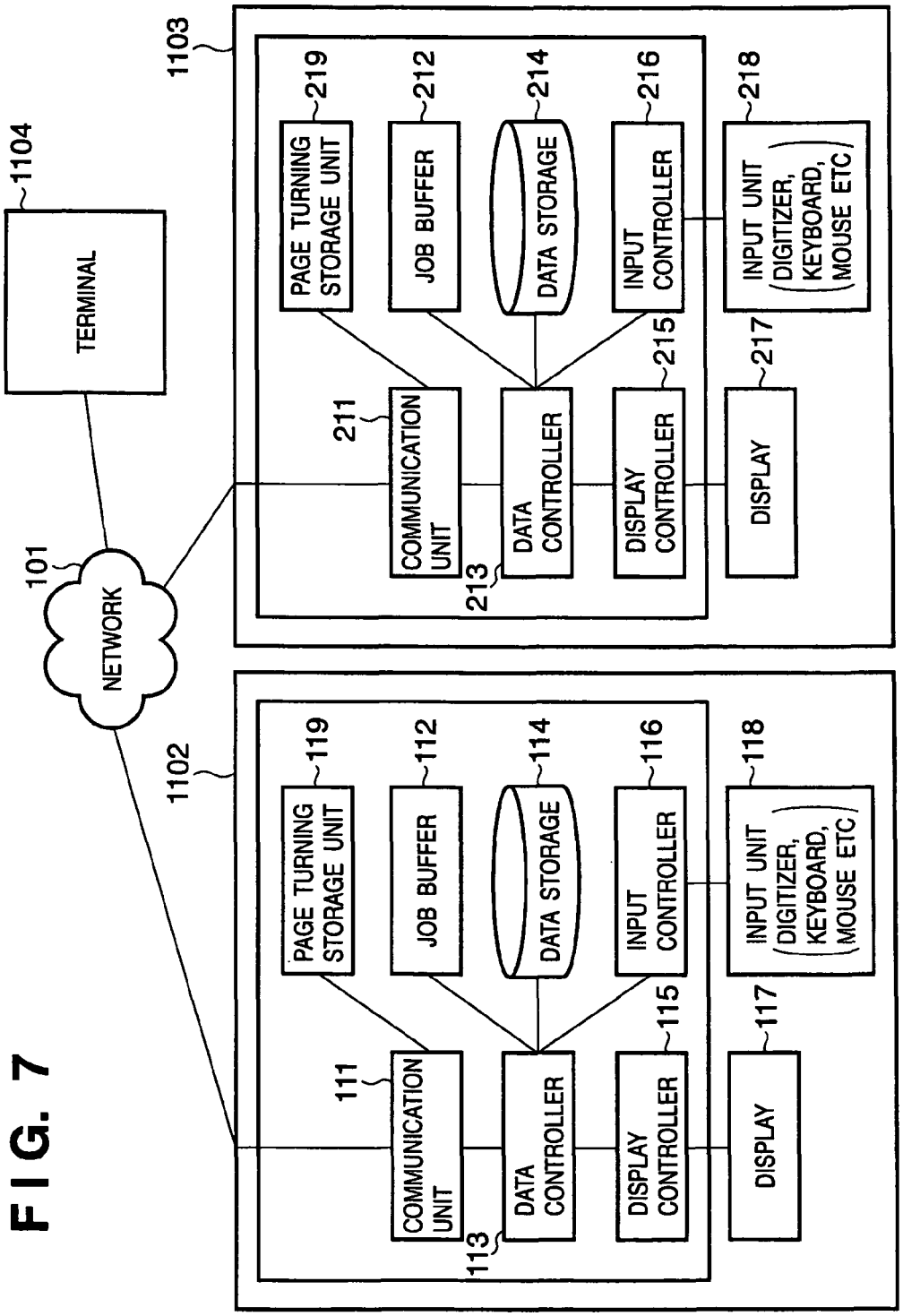
FIG. 7 is a block diagram showing the configuration of the collaboration support system according to a second embodiment of the present invention.

FIG. 7 is a block diagram showing the configuration of the collaboration support system according to a second embodiment of the present invention. In FIG. 7, constituent elements corresponding to those in the above-described first embodiment (FIG. 1) have the same reference numerals and explanations of the elements will be omitted.

In the second embodiment, respective terminals 1102 to 1104 correspond to the terminals 102 to 104 in the above-described first embodiment. These terminals 1102 to 1104 respectively have a page turning storage unit 119 (219) in addition to the elements in the first embodiment. The page turning storage unit 119 (219) holds a page turning destination designated upon page turning operation in the terminal or another terminal.

Next, the flow of the data object sharing operation in the collaboration support system according to the second embodiment will be described in detail with reference to the flowchart of FIG. 8. In the description, a new data object sharing operation is performed between the two terminals 1102 and 1103.

Figure 8:
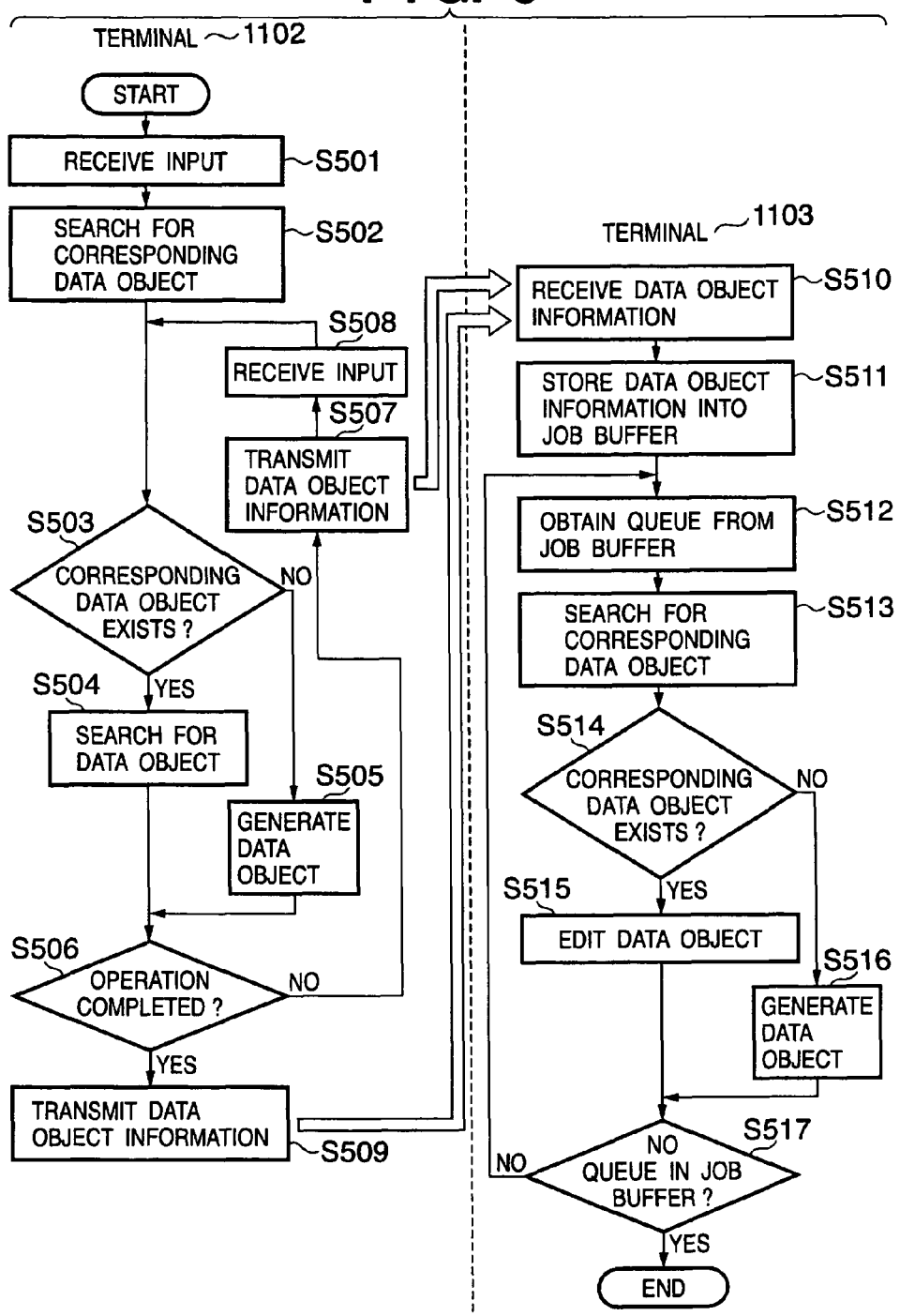
FIG. 8 is a flowchart showing processing of generation and editing of a new data object in a terminal and reception of the newly generated and edited data object as a common object in another terminal, according to the second embodiment.

FIG. 8 is a flowchart showing processing of generation and editing of a new data object in the terminal 1102 and reception of the newly generated and edited data object as a common object in the terminal 1103, according to the second embodiment. Note that the transition of screen display in the terminals 1102 and 1103 in the description is as described above in FIG. 3. Further, for the sake of simplification of explanation, the terminals 1102 to 1104 have established mutual connection using the respective communication units via the network 101, and the start processing (system entry processing, remote whiteboard function start processing and the like) of the collaboration support system has been already performed. In FIG. 8, processing at steps S501 to S509 is implemented by the terminal 1102, and processing at steps S510 to S517 is implemented by the terminal 1103.

The terminals 1102 and 1103 respectively start the remote whiteboard function, and the whiteboard displayed on the displays 117 (217) of the respective terminals is shared. At first, nothing is drawn on the whiteboard as shown in the display example 300 in FIG. 3.

In this status, at step S501, the terminal 1102 inputs data inputted by the user's input operation via the input controller 116 from the input unit 118. When the data input has been received, the process proceeds to step S502, at which the data controller 113 searches the data storage 114 to determine whether or not a data object related to the input data exists. Then at step S503, it is determined whether or not the data object exists, and in a case that it is determined that the data object exists, the process proceeds to step S504. Then editing processing is performed on the data object, and the data object information is stored into the data storage 114. Further, the information is displayed on the display 117 using the display controller 115 so as to inform the user of the result of the operation. Then the process proceeds to step S506, at which it is determined whether or not the user's operation has been completed, and in a case that it is determined that the operation has not been completed, the process proceeds to step S507.

On the other hand, if it is determined at step S503 that the data object does not exist, the process proceeds to step S505, at which new data object generation processing is performed, and the new data object information is stored into the data storage 114. Then the information is displayed on the display 117 using the display controller 115 so as to inform the user of the result of the operation (the display examples 301 to 304 in FIG. 3). If it is determined at step S506 that the input operation has not bee completed, the process proceeds to step S507. Then the data controller 113 transmits the data object information to the other terminal having the shared whiteboard (the terminal 1103 here) via the communication unit 111 and the network 101. Next, at step S508, the user's input operation is received via the input controller 116 from the input unit 118, and the process proceeds to step S503. Further, in a case that it is determined at step S506 that the input operation has been completed, the process proceeds to step S509. The data controller 113 transmits the data object information to the other terminal having the shared whiteboard (the terminal 1103 here) via the communication unit 111 and the network 101. Then the processing in the terminal 1102 ends.

Note that at step S507, it may take time in the communication processing between the terminals 1102 and 1103, it may be arranged such that thinning out operation is performed at predetermined time intervals or by a predetermined number of times and the data is transmitted at once.

Next, the processing in the terminal 1103 will be described.

First, at step S510, the terminal 1103 receives the data object information, newly generated and edited in the terminal 1102, from the communication unit 211 via the network 101. Next, at step S511, the received information is transferred to the data controller 213 and processed, and temporarily stored into the job buffer 212. Next, at step S512, the input information stored in the job buffer 212 is processed by the data controller 213 sequentially from the first-stored data item. Next, at step S513, the data controller 213 searches the data storage 214 to determine whether or not a data object related to the input information exists. Then at step S514, it is determined whether or not the data object related to the information exists, and if the data object exists, the process proceeds to step S515, at which editing processing is implemented on the data object. Then the data object is stored into the data storage 214. Further in a case that the data object is included in the currently-displayed page, the data object is displayed on the display 217 using the display controller 215. Then the process proceeds to step S517.

On the other hand, in a case that it is determined at step S514 that the data object does not exist, the process proceeds to step S516, at which new data object generation processing is performed, and the new data object is stored into the data storage 214. Further, in a case that the data object is included in the currently-displayed page, the data object is displayed on the display 217 using the display controller 215 (the display examples 302 to 304 of the terminal 103 in FIG. 3), and the process proceeds to step S517. At step S517, the data controller 213 examines the job buffer 212 to determine whether or not an unprocessed job exists in the queue. In a case that no unprocessed job exists, the processing in the terminal 1103 ends. On the other hand, if an unprocessed job exits, the process proceeds to step S512, at which the above-described processing is performed.

Next, processing upon page turning operation in the collaboration support system according to the second embodiment will be described in detail. The explanation of this operation will be performed from two viewpoints. As the first explanation, the operations in the terminals 1102 and 1103 will be described in detail with reference to the flowchart of FIG. 9. On the other hand, as the second explanation, screen transition will be described in detail with reference to transition of the screen displays in the terminals 1102 to 1104 in FIG. 10.

First, the flow of the page turning operation in the collaboration support system will be described in the page turning operation in the two terminals 1102 and 1103 with reference to FIG. 9.

Figure 9:
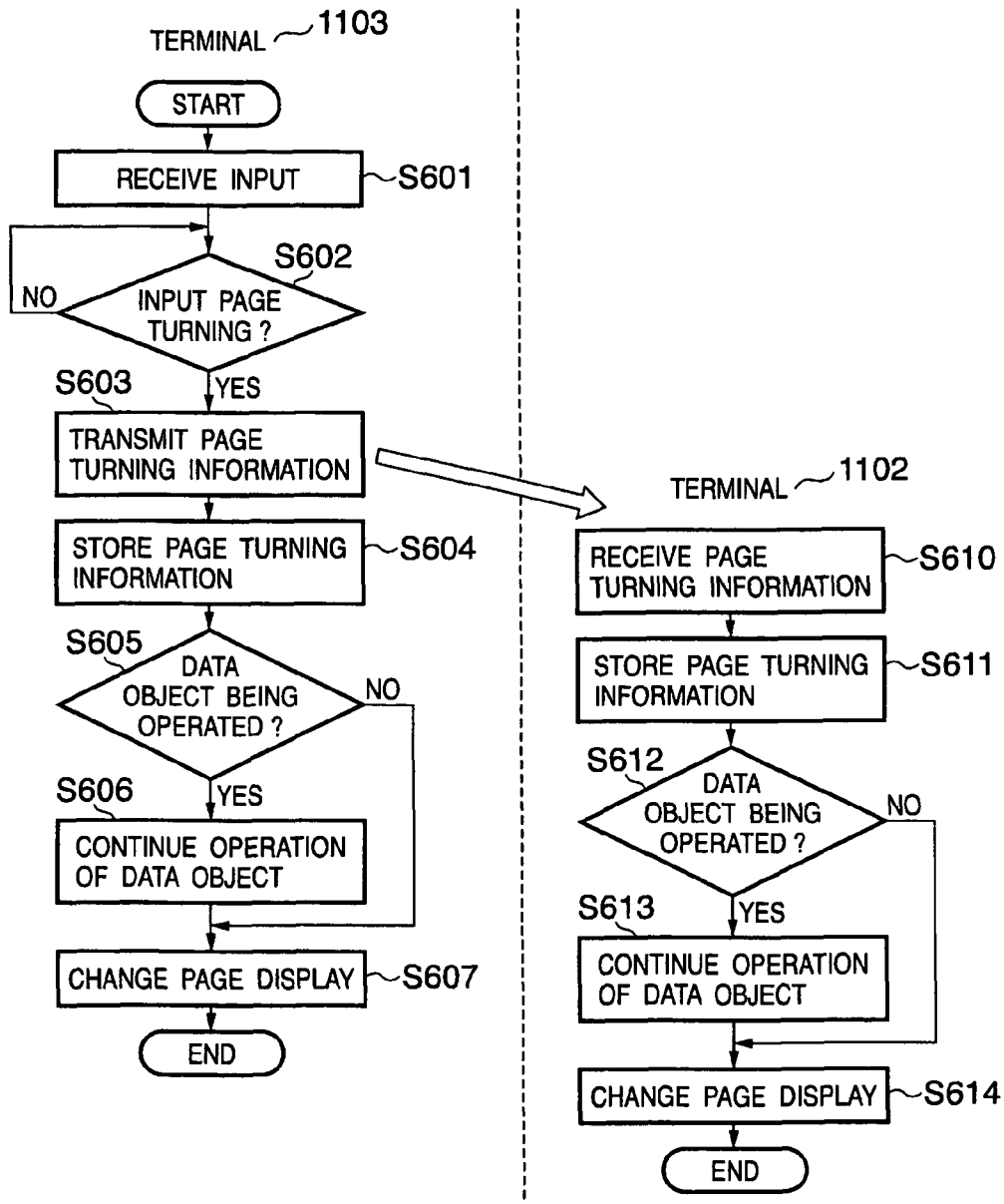
FIG. 9 is a flowchart showing processing of the page turning operation in the terminals according to the second embodiment.

FIG. 9 is a flowchart showing processing of the page turning operation in the terminals 1102 and 1103 according to the second embodiment. Note that for the sake of simplification of explanation, the terminals 1102 and 1103 have previously established mutual connection via the network 101 using the respective communication units, and the start processing (system entry processing, remote whiteboard function start processing and the like) of the collaboration support system has been already performed. Further, prior to the start of the flowchart of FIG. 9, the terminals 1102 and 1103 have started the remote whiteboard function, and the whiteboard shared by the remote whiteboard function has plural pages. Further, the first page of the whiteboard is displayed on the display 117 (217) of the terminals 1102 and 1103. While the user of the terminal 1102 is operating a new data object in the first page, page turning is performed in the terminal 1103. Note that in FIG. 9, processing at steps S601 to S607 is performed in the terminal 1103, and processing at steps S610 to S614 is performed in the terminal 1102.

First, at step S601, the terminal 1103 starts reception of the user's input operation via the input controller 216 from the input unit 218. When the input has been received at step S601, then at step S602, the data controller 213 determines whether or not the input operation is a page turning instruction. When the input operation is not a page turning instruction, the process proceeds to a processing step corresponding to the instructed processing. In this example, as the description is made only about the page turning, the process returns to step S601. When the input operation is a page turning instruction, the process proceeds to step S603. The data controller 213 of the terminal 1103 transmits the page turning information to the terminals having the shared whiteboard (the terminal 1102 (1104)) via the communication unit 211 and the network 101. Then at step S610, the terminal 1102 receives the page turning information transmitted from the terminal 1103 via the network 101 from the communication unit 111. The processing hereafter is common to the terminals 1102 and 1103.

Next, at step S604, in the terminal 1103 the page turning information is stored into the page turning storage unit 219. Next, at step S605, the data controller 213 of the terminal 1103 determines whether or not an operation such as drawing is performed. If the operation is performed, the operation is continuously performed at step S606, and if it is determined that the operation is interrupted or stopped, the process proceeds to step S607. If it is determined in step S605 that an operation is not performed, the process directly proceeds to step S607. At step S607, the data controller 213 obtains the page turning information from the page turning storage unit 219. Then, to perform the page turning, information of the destination page is obtained from the page turning storage unit 219, and the information is displayed on the display 217 via the display controller 215.

Similarly, in the terminal 1102, the page turning information is received at step S610, then at step S611, the page turning information is stored into the page turning storage unit 119. Next, at step S612, the data controller 113 of the terminal 1102 determines whether or not an operation such as drawing is performed. If the operation is performed, the operation is continuously performed at step S613. Then, if it is determined that the operation is interrupted or stopped, the process proceeds to step S614. Further, if it is determined at step S612 that an operation is not performed, the process proceeds to step S614, at which the data controller 113 obtains the page turning information from the page turning storage unit 119. Then, to perform the page turning, information of the destination page is obtained from the page turning storage unit 119, and the information is displayed on the display 117 via the display controller 115.

Next, the flow of the page turning sharing operation described above in the flowchart of FIG. 9 will be described with reference to the transition diagram of FIG. 10. As described above, FIG. 10 is a transition diagram of screen displays in the respective terminals in a page turning sharing operation in the terminals 1102 to 1104.

The terminals 1102 to 1104 have started the remote whiteboard function in advance, and the whiteboard shared among the terminals has four pages. Note that numeral 501 denotes page turning information stored in the page turning storage unit 119 (219) of the respective terminals, and symbol "-" indicates that no page turning information exists. Note that in this example, the number of page turning records is one, however, plural records may be stored. In this example, the number of page turning records is one so as to back a latest page upon completion of operation. In a case where plural records are stored, the page turning records can be reproduced.

In a display example 1001 in FIG. 10, the first page of the whiteboard is displayed on the display 117 (217) of the terminals 1102 to 1104. Then, the user of the terminal 1102 is drawing a free curve 1010 in the first page (P1) using the input unit 118, and the information of the free curve is shared between the terminals 1103 and 1104. At this time, in the terminal 1103, page turning from the first page to the third page is instructed (a display example 1001 in FIG. 10).

Then, page turning information "P3" is transmitted from the terminal 1103 to all the terminals, and stored in the page turning storage unit 119 (219) of the respective terminals (a display example 1002 and the corresponding example 501 in FIG. 10). The page turning in this case is not performed in the terminal 1102 performing the drawing operation, but performed in the terminals 1103 and 1104 not performing the drawing operation (a display example 1003 in FIG. 10). That is, in the terminals 1103 and 1104, the display of the first page by that time is interrupted and changed to the display of the third page.

Then, in the terminal 1102, when the drawing operation in the first page has been completed, the data controller 113 obtains the page turning information "P3" from the page turning storage unit 119. Then the data controller 113 changes the page displayed on the display 117 of the terminal 1102 to the third page (P3) (display example 1004 in FIG. 10).

Note that it may be arranged such that, to inform the user of the terminal 1102 of the page turning in the terminals 1103 and 1104, the screen is caused to blink, or "P3" or the like indicating that the page has been turned to the third page is displayed on the display 117 of the terminal 1102. This arrangement solves the problem that the user of the terminal 1102 continues the drawing operation without noticing the page turning in the other terminals 1103 and 1104.

According to the second embodiment, in a collaboration support system, where plural terminals each having at least a display unit and an input unit are interconnected via a network and the terminals share a data object, in a case that page turning or the like is instructed by a page turning operation or the like in one terminal or another terminal, an operation which is performed on a current page in the one terminal can be continued. Then, after the operation on the current page has been completed, the display of the one terminal is changed to the designated page.

Note that in the above embodiment, the configuration of the collaboration support system is not necessarily the above-described P2P system, but may be a client-server system.

Further, in the above embodiment, the participants (terminals) in the collaboration support system is two or three, however, the number of the participants may be four or more.

Further, the object of the present invention can also be achieved by providing a storage medium holding software program code for performing the functions of the embodiments to a system or an apparatus, reading the program code with a computer (e.g., CPU, MPU) of the system or apparatus from the storage medium, then executing the program.

In this case, the program code read from the storage medium realizes the functions according to the embodiments, and the storage medium holding the program code constitutes the invention.

Further, the storage medium, such as a Floppy® disk, a hard disk, a magneto-optical disk, a CD-ROM, a CD-R, a CD-RW, a DVD-ROM, a DVD-RAM, a DVD-R, a DVD+R, a DVD-RW, a DVD+RW, an HD-DVD, a Blue-ray Disc, a magnetic tape, a non-volatile type memory card, and a ROM can be used for providing the program code. Further, the program code may be downloaded via a network.

Furthermore, besides aforesaid functions according to the above embodiments are realized by executing the program code which is read by a computer, the present invention includes a case where an OS (operating system) or the like working on the computer performs a part or entire actual processing in accordance with designations of the program code and realizes functions according to the above embodiments.

Furthermore, the present invention also includes a case where, after the program code read from the storage medium is written in a function expansion card which is inserted into the computer or in a memory provided in a function expansion unit which is connected to the computer, CPU or the like contained in the function expansion card or unit performs a part or entire process in accordance with designations of the program code and realizes functions of the above embodiments.

As described above, according to the present embodiment, even when an operation on a data object is interrupted due to a page turning operation or the like in the terminal or another terminal, the information of the data object is not deleted but stored, and the display is continued such that the operation can be performed again. Accordingly, even when the operation is interrupted due to page turning or the like, the operation can be easily resumed.

Further, when the information of a data object, the operation on which has been interrupted, is held and then displayed, a display is produced so as to indicate that the data object has been interrupted in the middle of operation of the data object. Accordingly, the user can recognize that the operation of the data object has been interrupted and the status is different from the user's intended status, or that the status is insufficient in comparison with the user's intended status and it is necessary to resume the operation.

Further, according to the present embodiment, when page turning is instructed by an operation in a terminal or another terminal, the page turning is reflected in terminal(s) not performing an operation (e.g., drawing operation), while in terminal(s) performing an operation (e.g., drawing operation), the operation (e.g., drawing operation) in the respective terminal(s) can be continued, and after the completion of the operation (e.g., drawing operation) in the terminal, a latest page can be displayed in the respective terminal(s) in accordance with the page turning operation.

The present invention is not limited to the above embodiments and various changes and modifications can be made within the spirit and scope of the present invention. Therefore, to appraise the public of the scope of the present invention, the following claims are made.

This application claims the benefit of Japanese Patent Application No. 2005-157610, filed on May 30, 2005, which is hereby incorporated by reference herein in its entirety.

What is claimed is:

1. A collaboration support system comprising:
plural terminals interconnected via a network, wherein a data object can be shared among the plural terminals, and wherein respective ones of the plural terminals comprise:
a determination unit configured to determine whether or not a first changeover operation of a displayed image of the data object is performed on any of other terminals than a first terminal among the plural terminals, when a drawing operation for a data object is performed on the first terminal among the plural terminals and a common image is displayed in respective display units of the plural terminals, wherein the common image is related to the data object based on the drawing operation on the first terminal;
a display interrupt unit configured to interrupt the display of the data object that is displayed by the drawing operation on the first terminal and generate cancel information indicating that the display of the data object is interrupted, in a case that the determination unit determines that the first changeover operation of the displayed image of the data object is performed on any of the other terminals;
a first transmission unit configured to transmit the cancel information to the plural terminals so that the plural terminals cancel the display of the data object in accordance with the cancel information;
a storage unit configured to store the data object together with the cancel information upon a display interrupt by the display interrupt unit;
a display resume unit configured to cause the display unit of the first terminal to display the data object by changing a display form of the data object stored in the storage unit based on the cancel information, in a case that a second changeover operation for displaying the data object stored in the storage unit is performed on the display unit of the first terminal; and
a second transmission unit configured to restore the display form of the data object changed by the display resume unit and configured to transmit the data object whose display form has been restored to the other terminals so that the plural terminals display the data object whose display form has been restored, wherein the display form of the data object is restored in response to a selection of the data object displayed on the display unit of the first terminal by the display resume unit.

2. The system according to claim 1, wherein upon display interrupt by the display interrupt unit, the other terminals of the plural terminals delete a corresponding data object.

3. The system according to claim 1, wherein the first changeover operation is a turning operation of the displayed image.

4. A control method for a collaboration support system in which terminals are interconnected via a network, and a data object can be shared among plural terminals, comprising:

a determination step of determining whether or not a first changeover operation of a displayed image of the data object is performed on any of other terminals than a first terminal among the plural terminals, when a drawing operation for a data object is performed on the first terminal among the plural terminals and a common image is displayed in respective display units of the plural terminals, wherein the common image is related to the data object based on the drawing operation on the first terminal;

a display interrupt step of interrupting the display of the data object that is displayed by the drawing operation on the first terminal and generating cancel information indicating that the display of the data object is interrupted, in a case that it is determined in the determination step that the first changeover operation of the displayed image of the data object is performed on any of the other terminals;

a first transmission step of transmitting the cancel information to the plural terminals so that the plural terminals cancel the display of data object in accordance with the cancel information;

a storage step of storing the data object together with the cancel information upon display interrupt in the display interrupt step;

a display resume step of displaying the data object by changing a display form of the data object stored in the storage step based on the cancel information, in a case where a second changeover operation on the first terminal for displaying the data object stored in the storage step is performed on the display unit of the first terminal; and a second transmission step of restoring the display form of the data object changed in the display resume step and transmitting the data object whose display form has been restored to the other terminals so that the plural terminals display the data object whose display form has been restored, wherein the display form of the data object is restored in response to a selection of the data object displayed on the display unit of the first terminal in the display resume step.

5. The method according to claim 4, wherein, upon display interrupt in the display interrupt step, the other terminals of the plural terminals delete a corresponding data object.

6. The method according to claim 4, wherein the first changeover operation is a turning operation of the displayed image.

* * * * *